United States Patent [19]

Ammann

[11] Patent Number: 5,305,248
[45] Date of Patent: Apr. 19, 1994

[54] FAST IEEE DOUBLE PRECISION RECIPROCALS AND SQUARE ROOTS

[75] Inventor: Lawrence M. Ammann, Winchester, Va.

[73] Assignee: International Business Machines Corporation, Armonk, N.Y.

[21] Appl. No.: 53,035

[22] Filed: Apr. 23, 1993

[51] Int. Cl.$^5$ .............................................. G06F 7/38
[52] U.S. Cl. .................................... 364/748; 364/735; 364/752
[58] Field of Search ................ 364/748, 736, 761, 752, 364/735

[56] References Cited

U.S. PATENT DOCUMENTS

| Re. 33,629 | 7/1991 | Palmer et al. | 364/748 |
|---|---|---|---|
| 3,789,203 | 1/1974 | Catherall et al. | 364/723 |
| 3,978,326 | 8/1976 | Shimomura | 364/735 |
| 4,338,675 | 7/1982 | Palmer et al. | 364/748 |
| 4,484,259 | 11/1984 | Palmer et al. | 364/754 |
| 4,785,412 | 11/1988 | Tran | 364/761 |
| 4,839,842 | 6/1989 | Pyi et al. | 364/721 |
| 4,870,608 | 9/1989 | Kametani | 364/748 |
| 4,949,296 | 8/1990 | Malinowski | 364/752 |
| 5,042,001 | 8/1991 | Brightman et al. | 364/736 |
| 5,184,317 | 2/1993 | Pickett | 364/735 |

*Primary Examiner*—Tan V. Mai
*Attorney, Agent, or Firm*—Whitham & Marhoefer

[57] ABSTRACT

A method and apparatus implement reciprocal and square root calculations using Chebyshev polynomial approximation by scaling the mantissas of IEEE floating point numbers based on splitting them into intervals, thereby allowing Chebyshev polynomials of few terms to approximate each interval and resulting in high performance. A reciprocal or square root operation is implemented in a floating point unit (FPU) of a computer having a pipelined multiply accumulate function using a Chebyshev polynomial approximation. A plurality of Chebyshev coefficients are stored in read only storage. Mantissas m of floating point numbers are scaled based on splitting the mantissas into $2^n$ intervals i as:

$$m' = 2N \times m - (2N + 2i + 1),$$

where m' is the scaled mantissa and N is a power of 2. Using a predetermined number of high bits of the scaled mantissa, a set of stored coefficients are read from read only storage to compute the polynomial. The actual computation of the reciprocal or square root is performed by a plurality of multiply accumulates in the piplined function of the FPU to compute the polynomial approximation of the function f(m), which approximation differs from a correct answer by no more than 1 bit:

$$f(m) = c_0 + m' \times (c_1 + m' \times (c_2 + m' \times (c_3 + \cdots + m' \times c_n))),$$

where $c_0 \ldots c_n$ are the set of coefficients selected by the high bits of the mantissa. In addition, the method and apparatus distinguish approximations potentially requiring one bit error correction from those known to be correct.

20 Claims, 8 Drawing Sheets

FAST IEEE DOUBLE PRECISION RECIPROCALS AND SQUARE ROOTS

BACKGROUND OF THE INVENTION

1. Field of the Invention

The present invention generally relates to digital computer calculation of reciprocals and square roots and, more particularly, to a method and apparatus implementing reciprocal and square root calculations using Chebyshev polynomial approximation by scaling the mantissas of IEEE floating point numbers based on splitting them into $2^n$ intervals, thereby allowing Chebyshev polynomials of few terms to approximate each interval and resulting in high performance. In addition, the invention is directed to a method and apparatus distinguishing approximations potentially requiring one bit error correction from those known to be correct.

2. Description of the Prior Art

Workstations are now widely used for solving complex engineering problems. These machines are designed to comply with ANSI/IEEE (American National Standard Institute/Institute of Electrical and Electronics Engineers) Standard 754-1985, "IEEE Standard for Binary Floating-Point Arithmetic", published by IEEE, Inc., New York, August 1985. These machines typically use RISC (for Reduced Instruction Set Computer) technology for increased computational speed. An example of one such workstation is described in *IBM RISC System/6000 Technology*, IBM product number SA23-2619 (1990).

One of the most common floating-point arithmetic constructs is the dot product. At the heart of the dot product are the multiply and accumulate functions; i.e., $A \times C + B$. Many algorithms implemented on workstations also use divides and square roots. On a typical workstation, however, the performance of a double precision multiply exceeds that of a double precision divide or square root by an order of magnitude or more. For example, on the IBM RISC System/6000 workstation, a double precision $A \times C + B$ operation is completed in two cycles, and since this operation can be pipelined, it may be effectively performed in one cycle. In contrast, a divide takes nineteen cycles and a square root takes fifty-five cycles. Moreover, divides and square roots cannot be pipelined.

While polynomial approximations can boost the performance of square roots and divides, they suffer from two drawbacks which make their implementation a problem:

Intractable Precision Problems—Polynomial approximations, no matter how good, always result in some one bit errors. Since the IEEE 754 floating point standard specifies a result accurate to the least significant bit of a floating point mantissa for both square root and divide, none of these errors is acceptable when trying to meet the 754 standard. Although error detection and correction steps are possible, they usually result in vitiating the performance which was the reason for choosing a polynomial approximation in the first place.

Excessive Storage Requirements—In order to execute quickly, polynomials must have few terms. With just a few terms, a polynomial can only approximate a narrow interval accurately; therefore, the input argument must be split into many intervals, each of which is approximated by a different polynomial. The coefficient storage required for all these polynomials quickly adds up.

SUMMARY OF THE INVENTION

It is therefore an object of the present invention to provide a method which realizes the performance benefits of polynomial approximations while mitigating their inherent problems of excessive storage and inadequate precision.

It is another object of the invention to provide a method of performing divides and square roots using Chebyshev polynomial approximations which yields results that comply with the IEEE standard for floating-point arithmetic.

According to the invention, scaled Chebyshev polynomial approximations are used to improve the current poor performance of divide and square root functions $f(m)$. A reciprocal or square root operation is implemented in a floating point unit (FPU) of a computer having a pipelined multiply accumulate function using a Chebyshev polynomial approximation. A plurality of Chebyshev coefficients are stored in read only storage. Mantissas m of floating point numbers are scaled based on splitting the mantissas into $2^n$ intervals $i$, thereby allowing Chebyshev polynomials of few terms to approximate each interval, as $$m' = 2N \times m - (2N + 2i + 1),$$

where $m'$ is the scaled mantissa and $N$ is a power of 2. Using a predetermined number of high bits of the scaled mantissa, a set of stored coefficients are read from read only storage to compute the polynomial. The actual computation of the reciprocal or square root is performed by a plurality of multiply accumulates in the pipelined function of the FPU to compute the polynomial approximation of the function $f(m)$, which approximation differs from a correct answer by no more than 1 bit:

$$f(m) = c_0 + m' \times (c_1 + m' \times (c_2 + m' \times (c_3 + \ldots + m' \times c_n))),$$

where $c_0 \ldots c_n$ are the set of coefficients selected by the high bits of the mantissa.

Chebyshev series typically operate on values ranging from $-1$ to $+1$. Since mantissas of IEEE floating point numbers range from 1 to 2, they may be scaled to the range of $\frac{1}{2}$ to 1 by an appropriate setting of their exponent. However, for some functions, the convergence of a series can be improved by scaling the mantissa from $-1$ to $+1$, even though this requires more overhead than a simple exponent adjustment. A scaled Chebyshev approximation of reciprocal or square root requires about one eighth the storage of a least squares approximation of reciprocal or square root for comparable precision. As the Read Only Memory (ROM) sizes required for double precision coefficients of reciprocal or square root approximations can easily climb into the megabit range for short polynomials, this becomes a crucial advantage.

Given the continuing increase in chip densities, a double precision implementation of square root and reciprocal operations by polynomial approximation based on large, on-chip ROMs is possible. The driving factor in such an implementation is performance. This invention uses Chebyshev polynomial approximations of five terms to generate fast double precision results for the following functions:
Reciprocal
Square Root
1/Square Root The invention is implemented using one floating point multiply accumulator, one floating point adder, one comparator, exponent processing logic, and on-chip storage of polynomial coefficients for the above functions, and is capable of realizing the following performances:
Non pipelined speeds of about 9 cycles
Pipelined speeds of about 4 cycles
ROM sizes of about 225 Kbits per function

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
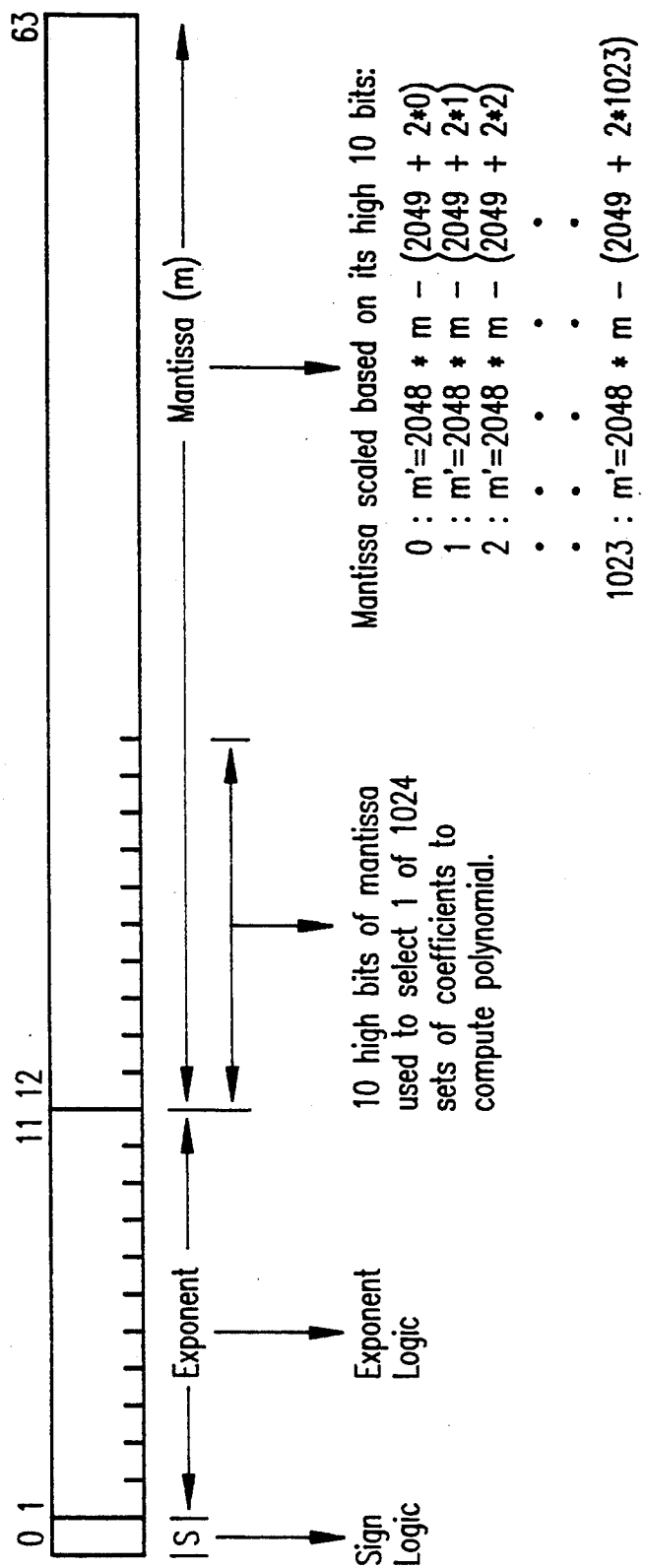
FIG. 1 is a block diagram illustrating double precision IEEE reciprocal mantissa scaling and processing.

Although square root and reciprocal are not usually implemented via polynomial approximation, there are Chebyshev polynomials which approximate them in relatively few terms. In particular, if the IEEE mantissa is scaled to range from −1 to 1 instead of from 1 to 2, both can be approximated to IEEE single precision accuracy in about ten terms. However, it is not necessary to approximate the entire mantissa with one polynomial. Dividing the mantissa into intervals reduces the number of terms required to approximate each interval. As the number of terms is reduced, total coefficient storage grows, since the decrease in polynomial length is outweighed by the increase in the number of polynomials required.

Chebyshev Single Precision Reciprocal Approximations

Table 1 shows the tradeoff between performance and storage for several polynomial lengths in a scaled Chebyshev reciprocal approximation (Errors are less than the least significant bit of an IEEE single precision mantissa).

TABLE 1

| Intervals per Mantissa | Terms per Interval | Bits per Term | Bits of Storage | Compressed Bits of Storage[1] | Cycles per Point Normal/Piped | Maximum Error |
|---|---|---|---|---|---|---|
| 1 | 10 | 32 | 320 | 256 | 19/9 | 3.77 E-8 |
| 8 | 5 | 32 | 1280 | 900 | 9/4 | 4.29 E-8 |
| 32 | 4 | 32 | 4096 | 2900 | 7/3 | 7.00 E-9 |
| 128 | 3 | 32 | 12288 | 8600 | 5/2 | 1.47 E-8 |

1. Coefficient storage may be compressed about 30% by taking advantage of the recurrence of high bits in exponents and of leading zeroes in the coefficients of higher powered terms.

Chebyshev vs Least Squares Approximations

Table 2 compares the storage required for quadratic least squares approximations of square root and reciprocal with scaled Chebyshev approximations.

TABLE 2

| Polynomial Type | Intervals per Mantissa | Terms per Interval | Bits per Term | Bits of Storage | Compressed Bits of Storage[1] | Cycles per Point Normal/Piped | Maximum Error |
|---|---|---|---|---|---|---|---|
| Least Squares SQRT | 512 | 3 | 30 | 46080 | 30720 | 4/2 | 1.57 E-7 |
| Chebyshev SQRT | 32 | 3 | 32 | 3072 | 2150 | 5/2 | 4.46 E-7 |
| Chebyshev SQRT | 64 | 3 | 32 | 6144 | 4300 | 5/2 | 5.76 E-8 |
| Least Squares RCIP | 512 | 3 | 32 | 46080 | 30720 | 4/2 | 1.57 E-7 |
| Chebyshev RCIP | 32 | 3 | 32 | 3072 | 2150 | 5/2 | 9.04 E-7 |
| Chebyshev RCIP | 64 | 3 | 32 | 6144 | 4300 | 5/2 | 1.16 E-7 |

1. Coefficient storage may be compressed about 30% by taking advantage of the recurrence of high bits in exponents and of leading zeroes in the coefficients of higher powered terms.

The price paid is the additional complexity of manipulating the mantissa at the beginning of a computation—namely, an extra subtract.

Scaled Chebyshev Approximations

Scaled Mantissas

Irvin Allen Dodes in *Numerical Analysis for Computer Science*, Elsevier North-Holland, Inc., New York (1978), describes a method of scaling input arguments for certain Chebyshev polynomials, in order to improve convergence. This invention extends Dodes' treatment to intervals; that is, the mantissa is split into intervals, each of which may be scaled.

Each interval of a mantissa split into $2^n$ intervals must be scaled differently. For the ith interval of N intervals (where N is a power of 2, and intervals are numbered from 0), a mantissa is scaled as:

$$m' = 2N \times m - (2N + 2i + 1),$$

where m is the mantissa, m' is the scaled mantissa, and i is the interval. For example, given four intervals, the arguments in the four intervals of the mantissa would be treated as follows:

$4/4 \ldots 5/4 \quad m' = 8m - 9$ $5/4 \ldots 6/4 \quad m' = 8m - 11$ $6/4 \ldots 7/4 \quad m' = 8m - 13$ $7/4 \ldots 8/4 \quad m' = 8m - 15$ Referring now to the drawings, and more particularly to FIG. 1, there is shown a block diagram illustrating double precision IEEE reciprocal mantissa scaling and processing. 64 bits are shown. The first bit is the sign bit. The next 11 bits are the exponent, the balance 52 bits are the mantissa. The ten high bits of the mantissa are used to select one of 1024 sets of coefficients to compute the polynomial. Although the scaled mantissa, m', is expressed as $2048 \times m - k$, it amounts to a simple subtract. The subtrahend is the input argument with its exponent replaced by $2^{11}$. The minuend is the subtrahend with the eleventh bit of the stored mantissa set to 1 and all the bits to its right set to zero. Since the rightmost 41 bits of the mantissa of the minuend are zero, a 12-bit adder should suffice. Four multiply accumulates complete the polynomial approximation of the reciprocal, which differs from the correct answer by no more than 1 bit.

$$RCIP(m) = c_0 + m' \times (c_1 + m' \times (c_2 + m' \times (c_3 + m' \times c_4)))$$

where m = input mantissa, m' = scaled mantissa, and $c_0 \ldots c_4$ = coefficients selected by high ten bits of mantissa.

Figure 2:
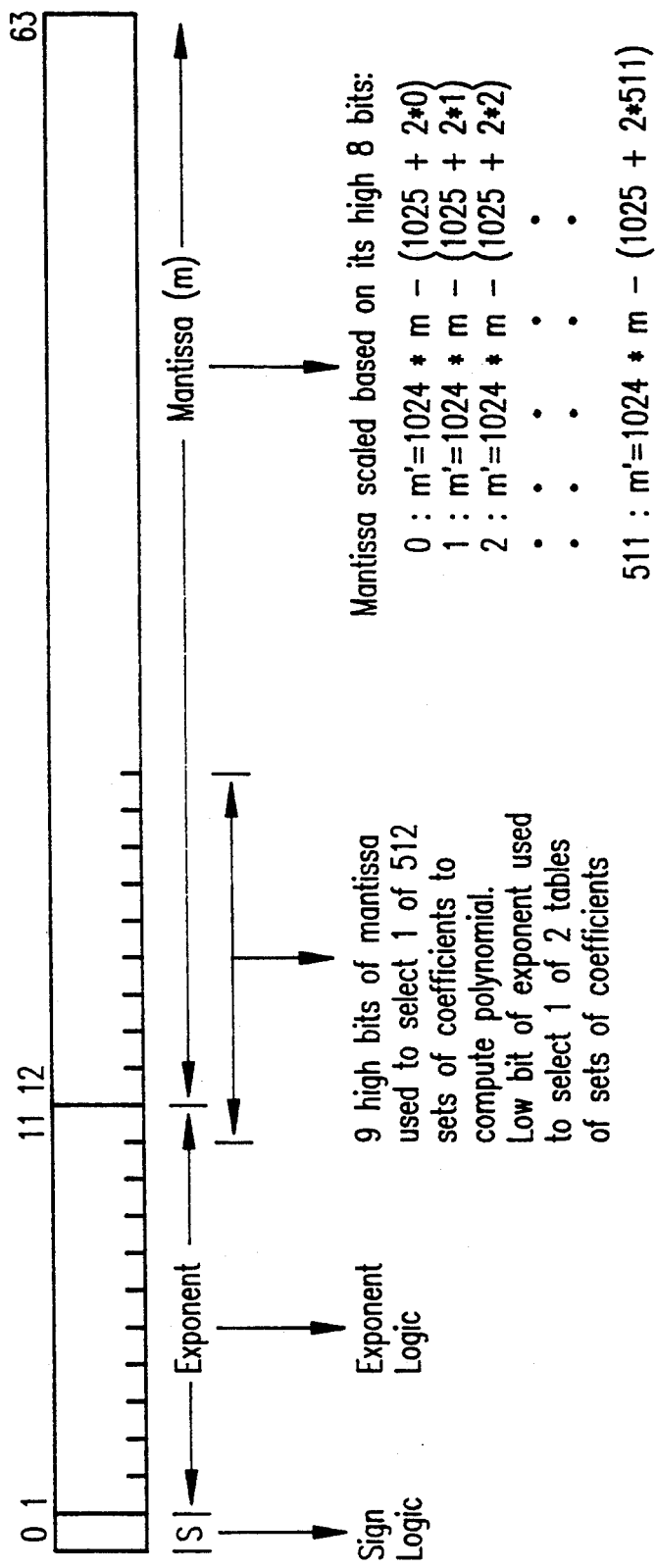
FIG. 2 is a block diagram illustrating double precision IEEE square root mantissa scaling and processing.

FIG. 2 shows a block diagram illustrating double precision IEEE square root mantissa scaling and processing. In this case, the nine high bits of the mantissa are used to select 1 of 512 sets of coefficients to compute the polynomial. The low bit of the exponent is used to select one of two tables of sets of coefficients. Although the scaled mantissa, m', is expressed as $1024 \times m - k$, it amounts to a single subtract. The subtrahend is the input argument with its exponent replaced by $2^{10}$. The minuend is the subtrahend with the tenth bit of the stored mantissa set to 1 and all the bits to its right set to zero. Since the rightmost 42 bits of the mantissa of the minuend are zero, an 11 bit adder should suffice. Four multiply accumulates complete the polynomial approximation of the square root, which differs from the correct answer by no more than 1 bit.

$$SQRT(m) = c_0 + m' \times (c_1 + m' \times (c_2 + m' \times (c_3 + m' \times c_4)))$$

where m = input mantissa, m' = scaled mantissa, and $c_0 \ldots c_4$ = coefficients selected by high nine bits of mantissa and by low bit of exponent. There are two tables of coefficient sets, one for arguments with even exponents and one for arguments with odd exponents. The tables differ by a factor of $2^{\frac{1}{2}}$.

Figure 3:
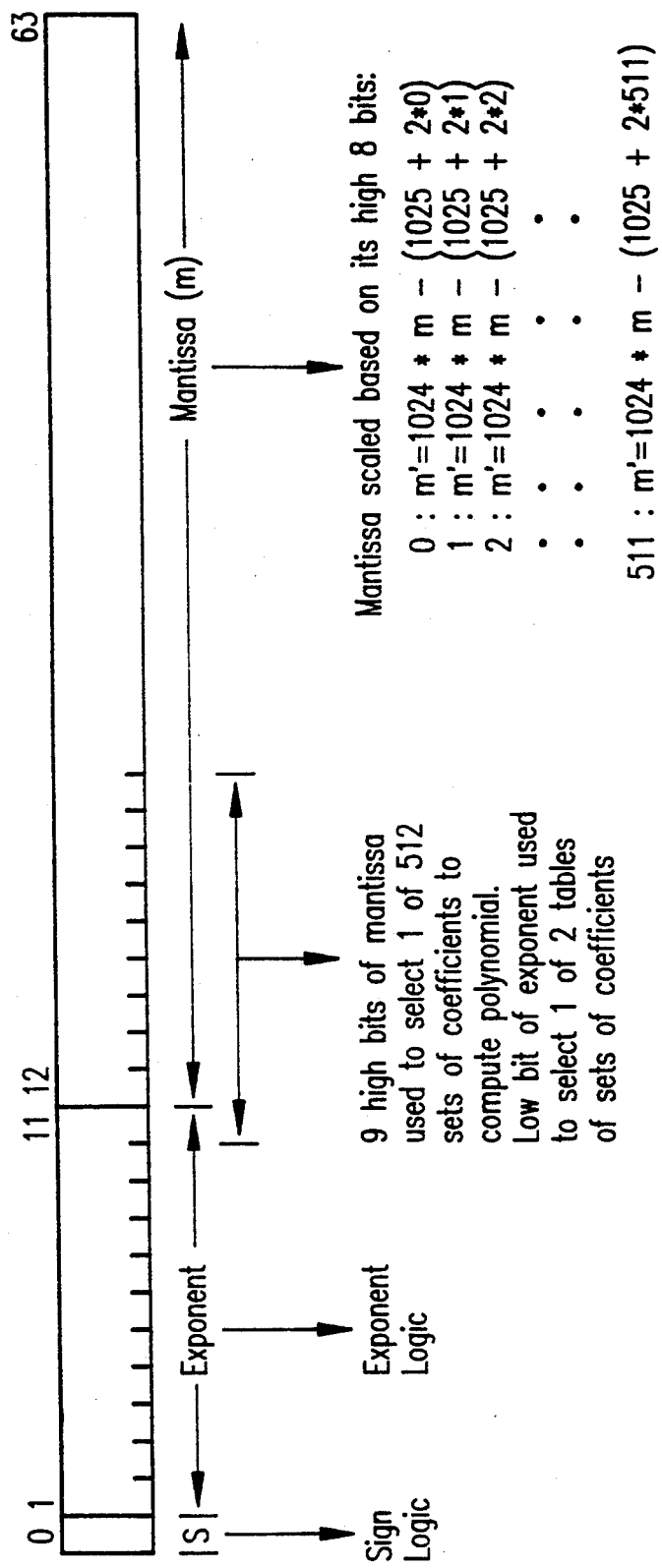
FIG. 3 is a block diagram illustrating double precision IEEE 1/square root mantissa scaling and processing.

FIG. 3 shows a block diagram illustrating double precision IEEE 1/square root mantissa scaling and processing. As in the square root case shown in FIG. 2, the nine high bits of the mantissa are used to select 1 of 512 sets of coefficients to compute the polynomial. The low bit of the exponent is used to select one of two tables of sets of coefficients. Although the scaled mantissa, m', is expressed as $1024 \times m - k$, it amounts to a single subtract. The subtrahend is the input argument with its exponent replaced by $2^{10}$. The minuend is the subtrahend with the tenth bit of the stored mantissa set to 1 and all the bits to its right set to zero. Since the rightmost 42 bits of the mantissa of the minuend are zero, an 11 bit adder should suffice. Four multiply accumulates complete the polynomial approximation of 1/square root, which differs from the correct answer by no more than 1 bit.

$$1/SQRT(m) = c_0 + m' \times (c_1 + m' \times (c_2 + m' \times (c_3 + m' \times c_4)))$$

where m = input mantissa, m' = scaled mantissa, and $c_0 \ldots c_4$ = coefficients selected by high nine bits of mantissa, and by low bit of exponent. There are two tables of coefficient sets, one for arguments with even exponents and one for arguments with odd exponents. The tables differ by a factor of $2^{\frac{1}{2}}$.

For five term Chebyshev polynomials, maximum errors versus the number of intervals over the IEEE mantissa are shown in Table 3.

TABLE 3

| Approximated Function | Number of Intervals | Maximum Error From Scaling Argument Mantissa | Maximum Error From Scaling Coefficients |
|---|---|---|---|
| Reciprocal | 1 | 0.0002538071392990 | 0.0002538071392983 |
|  | 2 | 0.0000191109582446 | 0.0000091109582439 |
|  | 4 | 0.0000010182366181 | 0.0000010182366177 |
|  | 8 | 0.0000000429453758 | 0.0000000429453770 |
|  | 16 | 0.0000000015749865 | 0.0000000015749855 |
|  | 32 | 0.0000000000534700 | 0.0000000000534683 |
|  | 64 | 0.0000000000017434 | 0.0000000000017444 |
|  | 128 | 0.0000000000000562 | 0.0000000000000585 |
|  | 256 | 0.0000000000000022 | 0.0000000000000047 |
|  | 512 | 0.0000000000000010 | 0.0000000000000038 |
|  | 1024 | 0.0000000000000008 | 0.0000000000000046 |
| Square Root | 1 | 0.0000111495488007 | 0.0000111495488007 |

TABLE 3-continued

| Approximated Function | Number of Intervals | Maximum Error From Scaling Argument Mantissa | Maximum Error From Scaling Coefficients |
| --- | --- | --- | --- |
|  | 2 | 0.0000006900270508 | 0.0000006900270508 |
|  | 4 | 0.0000000324515532 | 0.0000000324515534 |
|  | 8 | 0.0000000012732557 | 0.0000000012732557 |
|  | 16 | 0.0000000000448979 | 0.0000000000448981 |
|  | 32 | 0.0000000000014932 | 0.0000000000014930 |
|  | 64 | 0.0000000000000484 | 0.0000000000000486 |
|  | 128 | 0.0000000000000022 | 0.0000000000000024 |
|  | 256 | 0.0000000000000018 | 0.0000000000000018 |
|  | 512 | 0.0000000000000013 | 0.0000000000000018 |
| 1/Square Root | 1 | 0.000729602882616 | 0.0000729602882612 |
|  | 2 | 0.0000051550356615 | 0.0000051550356615 |
|  | 4 | 0.0000002636370035 | 0.0000002636370038 |
|  | 8 | 0.0000000108566921 | 0.0000000108566918 |
|  | 16 | 0.0000000003930070 | 0.0000000003930072 |
|  | 32 | 0.0000000000132518 | 0.0000000000132521 |
|  | 64 | 0.0000000000004303 | 0.0000000000004304 |
|  | 128 | 0.0000000000000140 | 0.0000000000000144 |
|  | 256 | 0.0000000000000012 | 0.0000000000000017 |
|  | 512 | 0.0000000000000010 | 0.0000000000000019 |

The first column of errors results from scaling the argument mantissa and using the computed Chebyshev polynomial as is. For example, given the interval 1 ... 2, the argument mantissa is scaled as:

$$m' = 2m - 3,$$

where m is the argument mantissa and m' is the scaled argument mantissa. For the interval 1 ... 2, the five term Chebyshev reciprocal polynomial coefficients are shown below, followed by some sample computations:

$c_0$  0.6667017101197747
$c_1$ −0.2212126623100560
$c_2$  0.0734572064784883
$c_3$ −0.0285706997456386
$c_4$  0.0098039142067434

$$Rcip(m) = c_0 + m' \times (c_1 + m' \times (c_2 + m' \times (c_3 + m' \times (c_4))))$$

$Rcip(1.00) = 0.6667 + -1.0 \times (-0.2212 + -1.0 \times (0.07346 + -1.0 \times (-0.02857 + -1.0 \times (0.009804)))) = 0.9997$ $Rcip(1.25) = 0.6667 + -0.5 \times (-0.2212 + -0.5 \times (0.07346 + -0.5 \times (-0.02857 + -0.5 \times (0.009804)))) = 0.7998$ $Rcip(1.50) = 0.6667 + 0.0 \times (-0.2212 + 0.0 \times (0.07346 + 0.0 \times (-0.02857 + 0.0 \times (0.009804)))) = 0.6667$ $Rcip(1.75) = 0.6667 + 0.5 \times (-0.2212 + 0.5 \times (0.07346 + 0.5 \times (-0.02857 + 0.5 \times (0.009804)))) = 0.5715$ $Rcip(2.00) = 0.6667 + 1.0 \times (-0.2212 + 1.0 \times (0.07346 + 1.0 \times (-0.02857 + 1.0 \times (0.009804)))) = 0.5002$

Scaled Coefficients

It is possible to avoid scaling input arguments to a Chebyshev polynomial by scaling the coefficients. Although this seems to be a desirable solution because it avoids the initial subtract, the effects on precision are not desirable. In addition, it means that one can not take advantage of leading zeroes in higher powered coefficients to compress storage because there are not any.

Scaled Coefficient Example

The second column of errors shown in Table 3 results from scaling the Chebyshev polynomial coefficients so that the mantissa may be used unchanged. For example, given the interval 1 ... 2, the scaled Chebyshev coefficients ($c_0'$ ... $c_4'$) are:

$c_0' = 1 \times c_0 - 3 \times c_1 + 9 \times c_2 - 27 \times c_3 + 81 \times c_4;$ $c_1' = 2 \times c_1 - 12 \times c_2 + 54 \times c_3 - 216 \times c_4;$ $c_2' = 4 \times c_2 - 36 \times c_3 + 216 \times c_4;$ $c_3' = 8 \times c_3 - 96 \times c_4;$ $c_4' = 16 \times c_4.$ For the interval 1 ... 2, the five term scaled Chebyshev reciprocal polynomial coefficients are shown below, followed by some sample computations:

$c_0'$  3.5569804992347946
$c_1'$ −4.9843750572830281
$c_2'$  3.4400194854135147
$c_3'$ −1.1697413618124737
$c_4'$  0.1568626273078941

$$Rcip(m) = c_0' + m \times (c_1' + m \times (c_2' + m \times (c_3' + m \times (c_4'))))$$

$Rcip(1.00) = 3.557 + 1.00 \times (-4.984 + 1.00 \times (3.440 + -1.00 \times (-1.170 + 1.00 \times (0.1569)))) = 0.9999$ $Rcip(1.25) = 3.557 + 1.25 \times (-4.984 + 1.25 \times (3.440 + -1.25 \times (-1.170 + 1.25 \times (0.1569)))) = 0.7999$ $Rcip(1.50) = 3.557 + 1.50 \times (-4.984 + 1.50 \times (3.440 + -1.50 \times (-1.170 + 1.50 \times (0.1569)))) = 0.6666$ $Rcip(1.75) = 3.557 + 1.75 \times (-4.984 + 1.75 \times (3.440 + -1.75 \times (-1.170 + 1.75 \times (0.1569)))) = 0.5711$ $Rcip(2.00) = 3.557 + 2.00 \times (-4.984 + 2.00 \times (3.440 + -2.00 \times (-1.170 + 2.00 \times (0.1569)))) = 0.4994$

Figure 4:
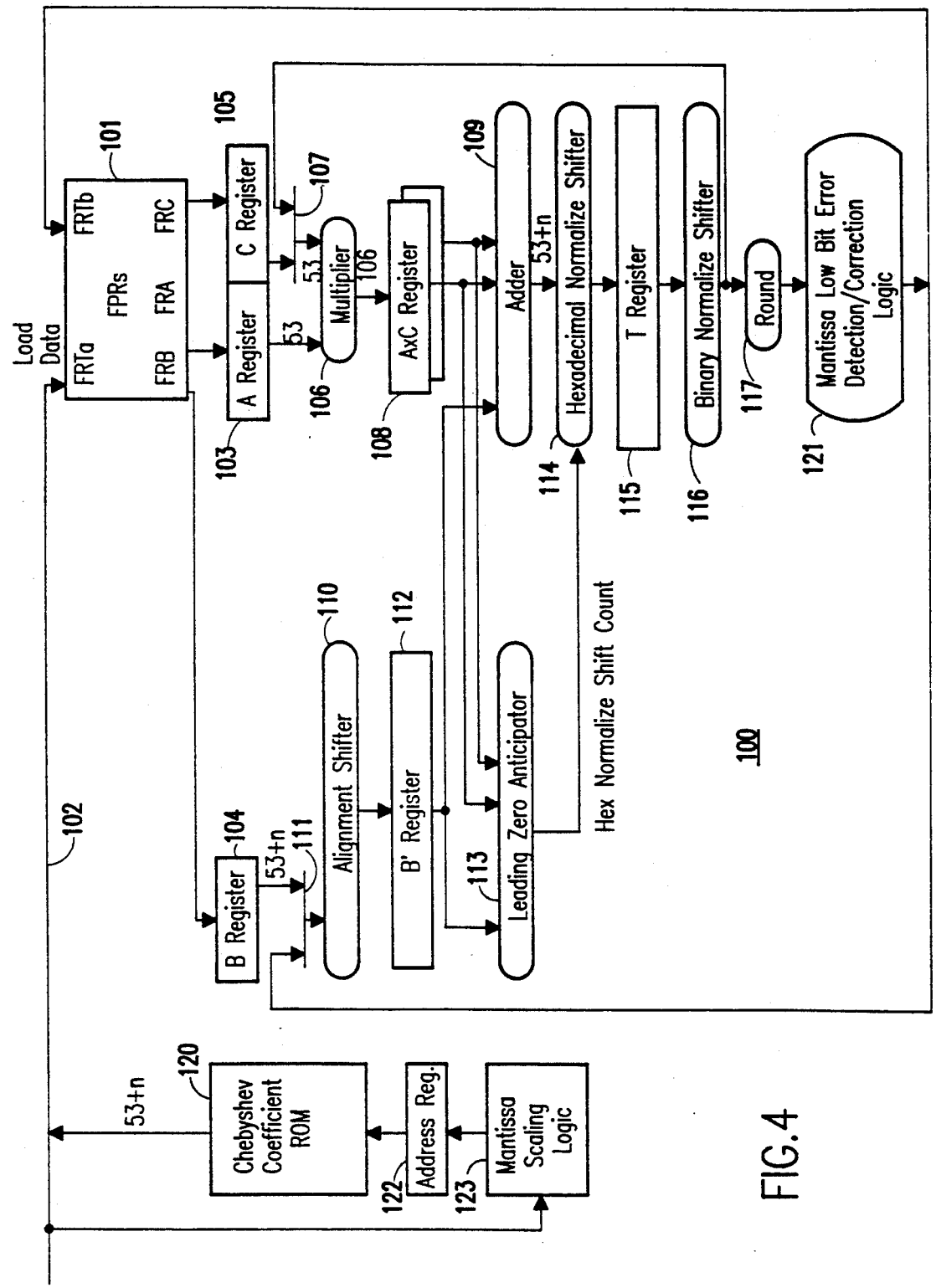
FIG. 4 is a block diagram of the floating point unit (FPU) hardware for implementing the double precision IEEE reciprocal and square root according to the invention.

Floating Point Unit for Reciprocals and Square Roots Using Chebyshev Polynomial Approximations FIG. 4 is a block diagram of the IBM RISC System/6000 floating point unit (FPU) 100 modified for mantissa reciprocal processing. The FPU implements the multiply-add primitive in a two-stage pipeline, providing single-cycle execution for most cases. In its basic implementation, floating point registers (FPRs) 101 receive data from a data bus 102 and the output of the FPU 100. The outputs of the FPRs 101 are loaded into an A register 103, a B register 104 and a C register 105. In the multiply-add primitive, the A register and the C register store the multiplicand and multiplier inputs, respectively, and the B register stores the addend input. The A register 103 supplies an input directly to multiplier 106, and the B register 104 supplies an input to the multiplier 106 via multiplexer 107. The product output of multiplier 106 is stored in A×C product register 108 which supplies the addend input to the adder 109.

The addend stored in the B register 104 is supplied to alignment shifter 110 via multiplexer 111. The shifted output is stored in B' register 112, which supplies the addend input of the adder 109. The B' register and the A×C register also supply inputs to the leading zero anticipator logic 113 which generates a Hex normalize shift count that controls hexadecimal normalize shifter 114 that shifts the output of adder 109 before temporarily storing the result in T register 115. The value in the T register is shifted again in binary normalize shifter 116, and this output is supplied as a second input to multiplexer 107. The output of the binary normalize shifter 116 is rounded in rounding logic 117 and supplied as the second input to FPRs 101 and the second input to multiplexer 111. It will be understood that the multiplexers 107 and 111 are controlled by the instruction decoder (not shown) to select an appropriate one of their inputs, depending on the decoded instruction.

Every floating-point arithmetic instruction execution passes through both the multiply and add stages of the FPU 100. Independent floating-point arithmetic instructions can be initiated every cycle. Dependent floating-point instructions, that is, instructions that specify a source operand that is the result of the previous instruction, can be initiated every other cycle.

As mentioned, in this basic form the FPU is able to perform a divide operation result in 16 to 19 cycles. The subject invention modifies the basic FPU by adding Chebyshev coefficient storage 120 and the mantissa low bit error detection/correction logic 121, as shown in FIG. 4. The storage 120 is a read only memory (ROM) which stores coefficients and is addressed by address register 122 which receives inputs from the mantissa scaling logic 123. When a divide or square root operation is decoded, the floating point operands are supplied from bus 102 to the mantissa scaling logic 123 which generates the input to address register 122. The set of coefficients output from the storage 120, comprising 53+n bits, are supplied to A and B registers 103 and 104 via the bus 102 and FPRs 101. The mantissa is supplied to the C register 105. The output of the FPU 100 is supplied to the error detection/correction logic 121. When performing a multiplication and accumulate primitave, A×C+B, the error detection/correction logic 121 passes the output of rounding logic 117 without performing the mantissa low bit checking.

For reciprocal processing, 53 bits are supplied by each of the A register 103 and the C register 105 to the multiplier 106. The output of the multiplier 106, which is temporarily stored in the A×C register 108, is 53+53 or 106 bits wide. The input to the B register 104 is 53+n bits which is supplied via the B' register 112 to the adder 109. The output of adder 109 is 53+n bits wide.

Figure 5:
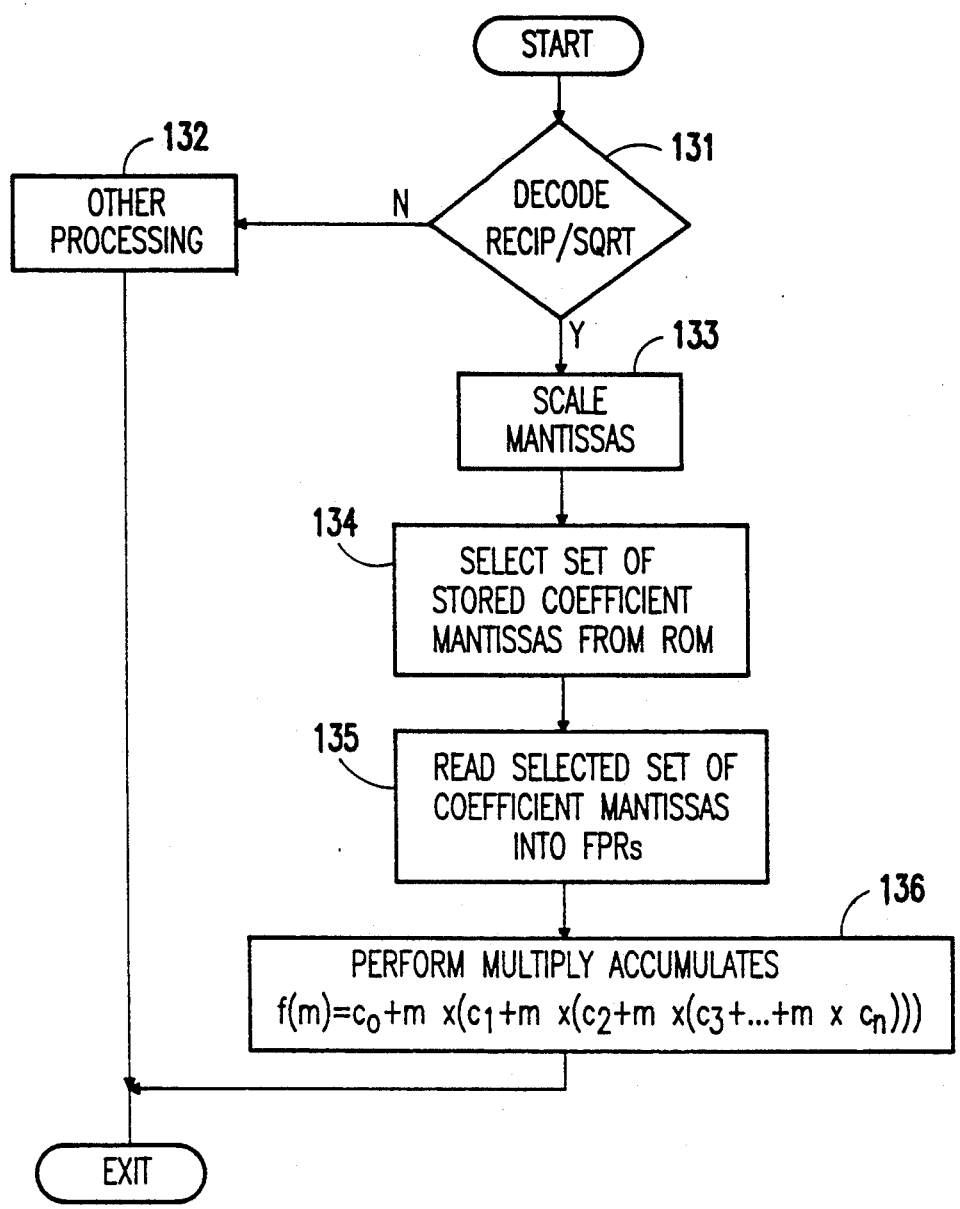
FIG. 5 is a flowchart showing the logic of the reciprocal and square root operation performed by the FPU shown in FIG. 4.

Referring to FIG. 5, there is shown a flowchart illustrating the logic of the reciprocal and square root processing implemented on the FPU 100 of FIG. 4. The process begins by identifying a reciprocal or square root operation from the decoder at decision block 131. If not a reciprocal or square root operation, other processing is performed in function block 132. When reciprocal or square root operations are decoded, the mantissas of the operands are scaled in function block 133 by scaling logic 123 by splitting the mantissas into $2^n$ intervals i as:

$$m' = 2N \times m - (2N + 2i + 1),$$

where m' is the scaled mantissa and N is a power of 2. A set of stored coefficient mantissas are selected from the read only storage 120 in function block 134, and these coefficient mantissas are read into the FPRs in function block 135. At this point the pipelined multiply accumulate function of the FPU 100 is invoked to perform the requisite number of multiply accumulates in function block 136.

Storage Estimates

The size of the ROM 120 in FIG. 4 required to store Chebyshev coefficient mantissa data is an important consideration in implementing the invention; for IEEE double precision, the following table sizes would suffice:

Reciprocal 360K bits→1 table×1024 entries×5 terms×72 bits

Square Root 360K bits→2 tables×512 entries×5 terms×72 bits

1/Square Root 360K bits→2 tables×512 entries×5 terms×72 bits

These storage estimates are easily seen to be too high, once a typical set of coefficients is examined, however. For example, the first set of coefficients for the 1024 entry reciprocal table is:

$$c_0 = 0.9995119570522204$$

$$c_1 = -0.0004878047618609$$

$$c_2 = 0.0000002380696760$$

$$c_3 = -0.0000000001161879$$

$$c_4 = 0.0000000000000546$$

Given that an IEEE 64 bit double precision floating point number comprises a 1-bit sign, an 11-bit exponent, and a 52-bit mantissa, and that 1 decimal digit is equal to about 3 binary digits, one could assume the following savings in the storage of this typical coefficient set:

8 bits per coefficient from the 11-bit exponent, since all the exponents of a given coefficient, $c_n$, will be very close to the same magnitude.

1 bit per coefficient from the sign bit, since Chebyshev polynomials alternate between positive and negative signs on successive coefficients.

$(3+6+9+12)\times 3 = 90$ bits per coefficient set from not storing leading zeroes of coefficients $c_1$, $c_2$, $c_3$, and $c_4$.

These adjustments subtract 135 bits from the initial size of 360 bits per coefficient set (5×72), meaning 225 bits instead of 360 must be stored per coefficient set. The missing bits of the coefficients could be stored once, and supplied when a coefficient was read out of a ROM. Therefore, better estimates of storage would be:

Reciprocal 225K bits or about 28K bytes

Square Root 225K bits or about 28K bytes

1/Square Root 225K bits or about 28K bytes

Error Detection and Correction

Chebyshev polynomials minimize the maximum error over an interval, thus providing the smoothest possible polynomial approximation. However, they are still approximations. At any given point, the value is either too large or too small. In most cases, this is not a problem, since the approximation rounds to the correct answer (assuming a polynomial for which the maximum error is less than the value of the least significant bit).

Figure 6:
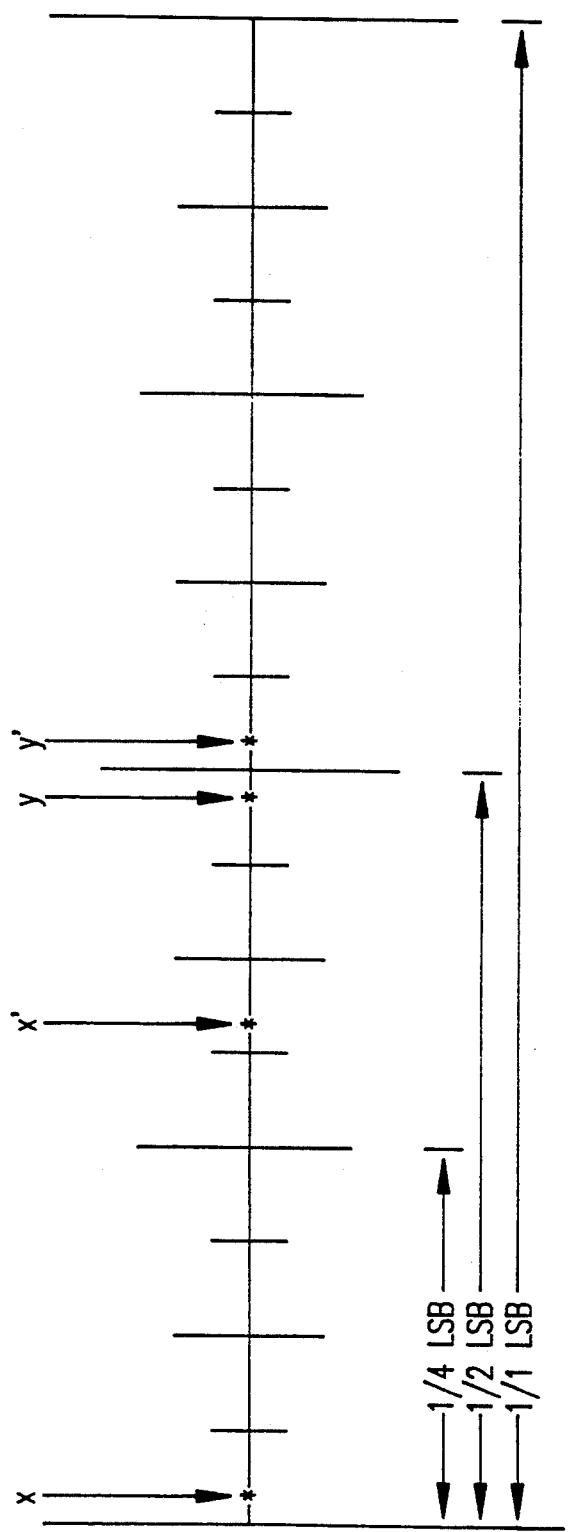
FIG. 6 is a graph illustrating the rounding errors in polynomial approximations.

The problem exists when the approximation falls into one half of the interval defined by the size of the least significant bit, and the IEEE correct answer falls into the other half. In this case, the approximation will round one way, and the IEEE correct answer will round the other way. FIG. 6 illustrates the problem:

The approximation, x', to the correct answer, x, will round (down) correctly in IEEE round to nearest mode, even though it exceeds x by more than ¼ LSB.

The approximation, y', to the correct answer, y, will round (up) incorrectly in IEEE round to nearest mode, even though it exceeds y by less than 1/16 LSB.

The interesting thing about this error is that it can not easily be fixed just by increasing the number of terms in the polynomial or shrinking the size of the interval. Both of these actions suffice only to reduce the number of errors, not eliminate them.

Extending Polynomial Coefficients

In order to generate an IEEE double precision result using a polynomial with just a few coefficients, the IEEE mantissa must be divided into numerous intervals, each of which requires a unique set of polynomial coefficients. This means that the constant coefficient of each set dominates the polynomial computation. For five term scaled Chebyshev polynomial approximations of square root and reciprocal accurate enough for IEEE double precision, the constant coefficient is at least $2^{10}$ greater than the rest of the polynomial.

Polynomials are always evaluated via Horner's rule, which expresses a polynomial:

$$c_0 + c_1 x + c_2 x^2 + + c_3 x^3 + \ldots + c_n x^n$$

in nested form as:

$$c_0 + x(c_1 + x(c_2 + x(c_3 + \ldots + x(c_n))))$$

Since nothing is multiplied by the constant coefficient, if the constant coefficient exceeds the rest of the polynomial by at least $2^n$, the mantissas of the polynomial constant coefficients can be extended by up to n bits without widening the multiplier. However, in the last multiply accumulate, the entire widened mantissa of the constant coefficient, $c_0$, must be added to the double wide result of the multiply, before that result is rounded back to double precision. The hardware effect of widening the mantissas of the polynomial constant coefficients amounts, therefore, to performing a widened add in the last multiply accumulate of the polynomial computation.

Each of the additional bits in the mantissas of the polynomial constant coefficients will halve the number of 1 bit errors remaining in the result. Therefore, by dividing an IEEE mantissa into a sufficient number of intervals and by extending the mantissas of the polynomial constant coefficients, the number of 1-bit errors in the resulting approximations can be dramatically reduced.

For example, the first set of coefficients for the 1024 entry reciprocal table is:

$c_0 = 0.9995119570522204$ $c_1 = -0.0004878047618609$ $c_2 = 0.0000002380696760$ $c_3 = -0.0000000001161879$ $c_4 = 0.0000000000000546$

In this case, the constant coefficient has at least 11 more significant bits that the rest of the polynomial; extending each constant coefficient by 11 bits could be expected to reduce the number of 1-bit errors by about 1023/1024. (Of course, in order to get 11 more bits of precision in the polynomial approximation, the number of intervals would have to be increased, increasing the coefficient storage.)

Detecting Potential 1 Bit Errors

Detection of potential 1-bit errors in the mantissa low bit error detection/correction logic 121 shown in FIG. 4 relies on the fact that any given polynomial approximation has a known maximum error. This maximum error translates directly into the minimum number of bits, n, beyond the least significant bit of a mantissa, which are expected to be correct.

Error Detection In IEEE Round to Nearest Mode

Figure 7:
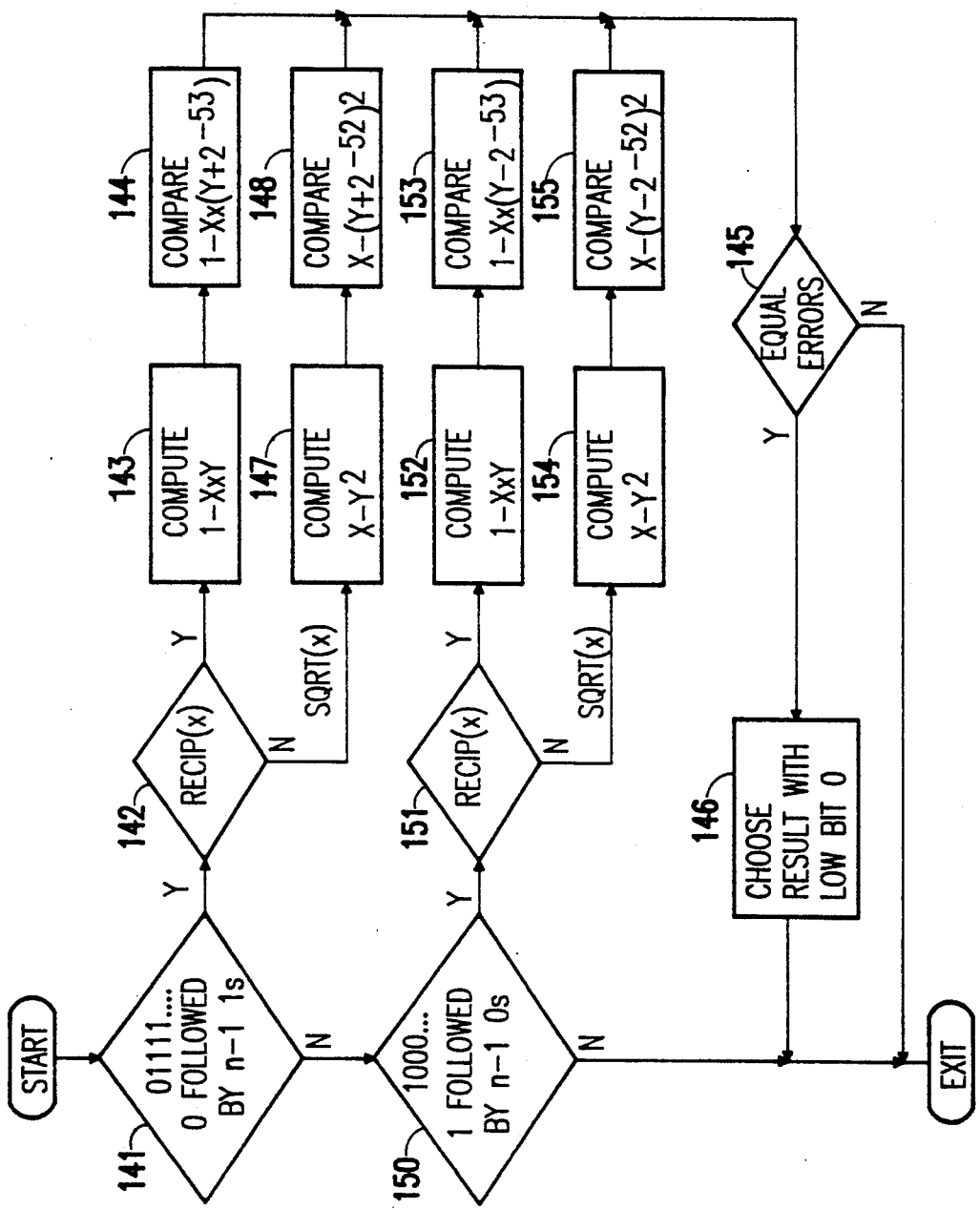
FIG. 7 is a flowchart illustrating the logic of the error detection in IEEE round to nearest mode.

FIG. 7 shows the logic of the process for IEEE round to nearest mode. In the flowchart, a test is first made in decision block 141 to determine if the bit pattern in the n extra bits is 01111 . . . (i.e., 0 followed by $n-1$ 1s). This bit pattern signifies that the mantissa is potentially 1 bit less than required by the IEEE 754 floating point standard, and should be compared to a result with an incremented mantissa. When this bit pattern is detected, a test is made in decision block 142 to determine if a reciprocal (RCIP(x)) is being computed. If so, the error, $1 - x \times y$, is computed in function block 142, where y is the approximation to rcip(x). Then, in function block 143, this error is compared to $1 - x \times (y + 2^{-53})$, and the result with less error is chosen. If the compared results have equal errors, as determined in decision block 145, the result with a low bit of 0 is chosen in function block 146. If a reciprocal is not being computed in decision block 142, then a square root (SQRT(x)) is being computed. In that case, $x - y^2$ is computed in function block 147, where y is the approximation to sqrt(x). This error is then compared to $x - (y + 2^{-52})^2$ in function block 148, and the result with less error is chosen. As in the case of a reciprocal computation, if the compared results have equal errors, the result with a low bit of 0 is chosen.

If the bit pattern in the n extra bits is not 01111 . . . (0 followed by $n-1$ 1s), then a test is made in decision block 150 to determine if the bit pattern in the n extra bits is 10000 . . . (i.e., 1 followed by $n-1$ 0s). This bit pattern signifies that the mantissa is potentially 1 bit greater than required by the IEEE 754 floating point standard. When this bit pattern is detected, a test is made in decision block 151 to determine if a reciprocal (RCIP(x)) is being computed. If so, the error, $1 - x \times y$, is computed in function block 152, where y is the approximation to rcip(x). Then, in function block 153, this error is compared to $1 - x \times (y + 2^{-53})$, and the result with less error is chosen. If the compared results have equal errors, as determined in decision block 145, the result with a low bit of 0 is chosen in function block 146. If a reciprocal is not being computed in decision block 151, then a square root (SQRT(x)) is being computed. In that case, $x-y^2$ is computed in function block 154, where y is the approximation to sqrt(x). This error is then compared to $x-(y+2^{-52})^2$ in function block 155, and the result with less error is chosen. As in the case of a reciprocal computation, if the compared results have equal errors, the result with a low bit of 0 is chosen.

In the case of all other bit patterns, these mantissas meet the requirements of the IEEE 754 floating point standard and require no error correction. At this point, the process exits. It should be noted that $2/2^n$ cases will be at risk for 1-bit errors, and that $2^n - 2/2^n$ cases will be free of errors.

Error Detection In Other IEEE Rounding Modes

Figure 8:
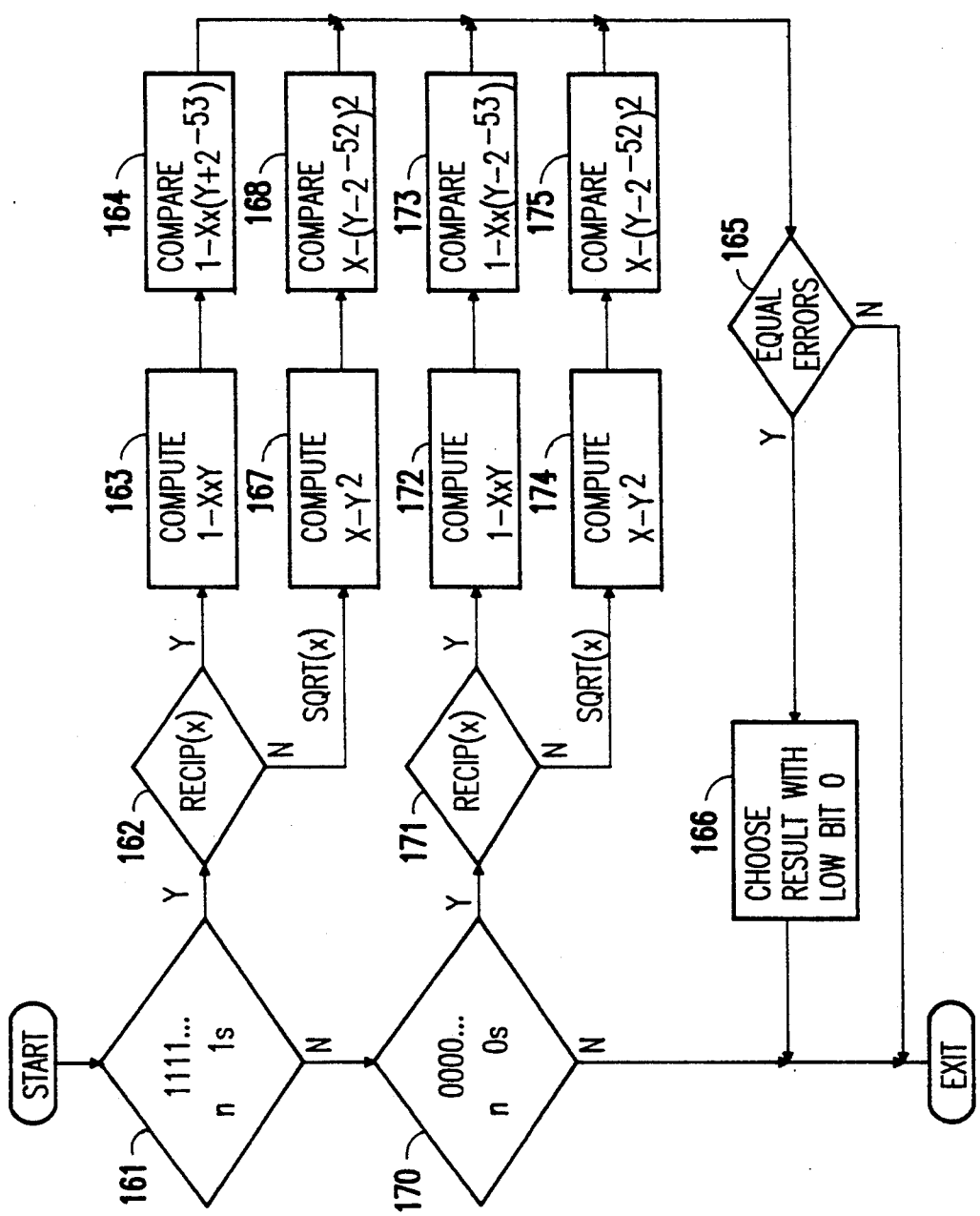
FIG. 8 is a flowchart illustrating the logic of the error detection for all IEEE rounding modes other than round to nearest mode.

FIG. 8 shows the logic for all IEEE rounding modes other than round to nearest mode. In the flowchart, a test is first made in decision block 161 to determine if the bit pattern in the n extra bits is 11111 ... (i.e., n 1s). This bit pattern signifies that the mantissa is potentially 1 bit less than required by the IEEE 754 floating point standard, and should be compared to a result with an incremented mantissa. When this bit pattern is detected, a test is made in decision block 162 to determine if a reciprocal (RCIP(x)) is being computed. If so, the error, $1-x\times y$, is computed in function block 163, where y is the approximation to rcip(x). Then, in function block 164, this error is compared to $1-x\times(y+2^{-53})$, and the result with less error is chosen. If the compared results have equal errors, as determined in decision block 165, the result with a low bit of 0 is chosen in function block 166. If a reciprocal is not being computed in decision block 162, then a square root (SQRT(x)) is being computed. In that case, $x-y^2$ is computed in function block 167, where y is the approximation to sqrt(x). This error is then compared to $x-(y+2^{-52})^2$ in function block 168, and the result with less error is chosen. As in the case of a reciprocal computation, if the compared results have equal errors, the result with a low bit of 0 is chosen.

If the bit pattern in the n extra bits is not 11111 ... (n 1s), then a test is made in decision block 170 to determine if the bit pattern in the n extra bits is 00000 ... (i.e., n 0s). This bit pattern signifies that the mantissa is potentially 1 bit greater than required by the IEEE 754 floating point standard. When this bit pattern is detected, a test is made in decision block 171 to determine if a reciprocal (RCIP(x)) is being computed. If so, the error, $1-x\times y$, is computed in function block 172, where y is the approximation to rcip(x). Then, in function block 173, this error is compared to $1-x\times(y+2^{-53})$, and the result with less error is chosen. If the compared results have equal errors, as determined in decision block 165, the result with a low bit of 0 is chosen in function block 166. If a reciprocal is not being computed in decision block 171, then a square root (SQRT(x)) is being computed. In that case, $x-y^2$ is computed in function block 174, where y is the approximation to sqrt(x). This error is then compared to $x-(y+2^{-52})^2$ in function block 175, and the result with less error is chosen. As in the case of a reciprocal computation, if the compared results have equal errors, the result with a low bit of 0 is chosen.

In the case of all other bit patterns, these mantissas meet the requirements of the IEEE 754 floating point standard and require no error correction. At this point, the process exits. As in the preceeding case, it should be noted that $2/2^n$ cases will be at risk for 1-bit errors, and that $2^n - 2/2^n$ cases will be free of errors.

While the invention has been described in terms of a single preferred embodiment, those skilled in the art will recognize that the invention can be practiced with modification within the spirit and scope of the appended claims.

Having thus described my invention, what I claim as new and desire to secure by Letters Patent is as follows:

1. A floating point unit (FPU) in a computer for calculating a mathematical function f(m), where f(m) is a reciprocal or square root function, said FPU having a pipelined multiply accumulate function and further comprising:

read only memory (ROM) for storing a plurality of Chebyshev coefficients;

scaling logic means for scaling mantissas m' of floating point numbers, said mantissas m being scaled based on splitting the mantissas into $2^n$ intervals i, thereby allowing Chebyshev polynomials of few terms to approximate each interval, as:

$$m'=2N\times m-(2N+2i+1),$$

where N is a power of 2;

addressing means responsive to said scaling logic for selecting a set of stored coefficients from said read only memory to compute the polynomial using a predetermined number of high bits of a mantissa, a selected set of coefficients being supplied to said FPU; and said FPU performing a plurality of multiply accumulates using said multiply accumulate function to compute the polynomial approximation of the function f(m), which approximation differs from a correct answer by no more than 1 bit:

$$f(m)=c_0+m'\times(c_1+m'\times(c_2+m'\times(c_3+ \ldots +m'\times c_n))),$$

where $c_0 \ldots c_n$ are the set of coefficients selected by the addressing means using the high bits of the mantissa.

2. The FPU according to claim 1 wherein sixty-four bits are used to store a double precision floating point number, comprising one bit for a sign, eleven bits for an exponent, and fifty-two bits for a mantissa, and wherein the function f(m) is a reciprocal (RCIP(x)) and the mantissas are scaled based on ten high bits of the mantissa, said ten high bits being used by said addressing means to select one of 1024 sets of coefficients.

3. The FPU according to claim 1 wherein sixty-four bits are used to store a double precision floating point number, comprising one bit for a sign, eleven bits for an exponent, and fifty-two bits for a mantissa, and wherein the function f(m) is a square root (SQRT(x)) and the mantissas are scaled based on nine high bits of the mantissa, said nine high bits plus one being used by said addressing means to select one of 1024 sets of coefficients.

4. The FPU according to claim 1 wherein sixty-four bits are used to store a double precision floating point number, comprising one bit for a sign, eleven bits for an exponent, and fifty-two bits for a mantissa, and wherein the function f(m) is a reciprocal of a square root (1/SQRT(x)) and the mantissas are scaled based on nine high bits of the mantissa, said nine high bits plus one being used by said addressing means to select one of 1024 sets of coefficients.

5. The FPU according to claim 1 wherein a reciprocal (RCIP(x)) is being computed and the multiply accumulate function generates n extra bits more than is allotted to the mantissa when computing the polynomial approximation of the reciprocal function, further comprising:
   detecting means for detecting a bit pattern in the n extra bits of 01111 ... (i.e., 0 followed by n−1 1s), this bit pattern signifying that the mantissa is potentially 1 bit less than required and should be compared to a result with an incremented mantissa;
   error computation means for computing the error, $1-x \times y$, where y is an approximation to rcip(x);
   comparing means for comparing the computed error, $1-x \times y$, to $1-x \times (y+2^{-53})$; and
   means for selecting a result with less error.

6. An FPU according to claim 5 wherein if the compared results in the comparing means have equal errors, then said means for selecting selects a result with a low bit of 0.

7. An FPU according to claim 1 wherein a square root (SQRT(x)) is being computed and the multiply accumulate function generates n extra bits more than is allotted to the mantissa when computing the polynomial approximation of the square root function, further comprising:
   detecting means for detecting if a bit pattern in the n extra bits is 01111 ... (i.e., 0 followed by n−1 1s), this bit pattern signifying that the mantissa is potentially 1 bit less than required and should be compared to a result with an incremented mantissa;
   error computation means for computing the error, $x-y^2$, where y is the approximation to sqrt(x);
   comparing means for comparing the computed error, $x-y^2$, to $x-(y+2^{-52})^2$; and
   means for selecting a result with less error.

8. An FPU according to claim 7 wherein if the compared results in the comparing means have equal errors, then said means for selecting selects a result with a low bit of 0.

9. The FPU according to claim 1 wherein a reciprocal (RCIP(x)) is being computed and the multiply accumulate function generates n extra bits more than is allotted to the mantissa when computing the polynomial approximation of the reciprocal function, further comprising:
   detecting means for detecting a bit pattern in the n extra bits of 10000 ... (i.e., 1 followed by n−1 0s), this bit pattern signifying that the mantissa is potentially 1 bit more than required and should be compared to a result with a decremented mantissa;
   error computation means for computing the error, $1-x \times y$, where y is an approximation to rcip(x);
   comparing means for comparing the computed error, $1-x \times y$, to $1-x \times (y-2^{-53})$; and
   means for selecting a result with less error.

10. An FPU according to claim 9 wherein if the compared results in the comparing means have equal errors, then said means for selecting selects a result with a low bit of 0.

11. An FPU according to claim 1 wherein a square root (SQRT(x)) is being computed and the multiply accumulate function generates n extra bits more than is allotted to the mantissa when computing the polynomial approximation of the square root function, further comprising:
   detecting means for detecting if a bit pattern in the n extra bits is 10000 ... (i.e., 1 followed by n−1 0s), this bit pattern signifying that the mantissa is potentially 1 bit more than required and should be compared to a result with a decremented mantissa;
   error computation means for computing the error, $x-y^2$, where y is the approximation to sqrt(x);
   comparing means for comparing the computed error, $x-y^2$, to $x-(y-2^{-52})^2$; and
   means for selecting a result with less error.

12. An FPU according to claim 11 wherein if the compared results in the comparing means have equal errors, then said means for selecting selects a result with a low bit of 0.

13. An FPU according to claim 1 wherein a reciprocal (RCIP(x)) is being computed and the multiply accumulate function generates n extra bits more than is allotted to the mantissa when computing the polynomial approximation of the reciprocal function, further comprising:
   detecting means for detecting a bit pattern in the n extra bits of 11111 ... (i.e., n 1s), this bit pattern signifying that the mantissa is potentially 1 bit less than required and should be compared to a result with an incremented mantissa;
   error computation means for computing an error, $1-x \times y$, where y is an approximation to rcip(x);
   comparing means for comparing the computed error, $1-x \times y$, to $1-x \times (y+2^{-53})$; and
   means for selecting a result with less error.

14. An FPU according to claim 13 wherein if the compared results in the comparing means have equal errors, then said means for selecting selects a result with a low bit of 0.

15. An FPU according to claim 1 wherein a square root (SQRT(x)) is being computed and the multiply accumulate function generates n extra bits more than is allotted to the mantissa when computing the polynomial approximation of the square root function, further comprising:
   detecting means for detecting if a bit pattern in the n extra bits is 11111 ... (i.e., n 1s), this bit pattern signifying that the mantissa is potentially 1 bit more than required and should be compared to a result with an incremented mantissa;
   error computation means for computing an error, $x-y^2$, where y is the approximation to sqrt(x);
   comparing means for comparing the computed error, $x-y^2$, to $x-(y+2^{-52})^2$; and
   means for selecting a result with less error.

16. An FPU according to claim 15 wherein if the compared results in the comparing means have equal errors, then said means for selecting selects a result with a low bit of 0.

17. An FPU according to claim 1 wherein a reciprocal (RCIP(x)) is being computed and the multiply accumulate function generates n extra bits more than is allotted to the mantissa when computing the polynomial approximation of the reciprocal function, further comprising:
   detecting means for detecting a bit pattern in the n extra bits of 00000 ... (i.e., n 0s), this bit pattern signifying that the mantissa is potentially 1 bit more than required and should be compared to a result with a decremented mantissa;

error computation means for computing an error, $1-x\times y$, where y is an approximation to rcip(x);

comparing means for comparing the computed error, $1-x\times y$, to $1-x\times(y-2^{-53})$; and means for selecting a result with less error.

18. An FPU according to claim 17 wherein if the compared results in the comparing means have equal errors, then said means for selecting selects a result with a low bit of 0.

19. An FPU according to claim 1 wherein a square root (SQRT(x)) is being computed and the multiply accumulate function generates n extra bits more than is allotted to the mantissa when computing the polynomial approximation of the square root function, further comprising:

detecting means for detecting if a bit pattern in the n extra bits is 00000 . . . (i.e., n 0s), this bit pattern signifying that the mantissa is potentially 1 bit more than required and should be compared to a result with a decremented mantissa;

error computation means for computing an error, $x-y^2$, where y is the approximation to sqrt(x);

comparing means for comparing the computed error, $x-y^2$, to $x-(y-2^{-52})^2$; and means for selecting a result with less error.

20. An FPU according to claim 19 wherein if the compared results in the comparing means have equal errors, then said means for selecting selects a result with a low bit of 0.

* * * * *